(12) United States Patent
Scobie et al.

(10) Patent No.: US 12,470,067 B2
(45) Date of Patent: Nov. 11, 2025

(54) POWER CONTROL APPARATUS AND METHOD

(71) Applicant: Enoda Ltd., London (GB)

(72) Inventors: Andrew John Scobie, London (GB); Yihong Wan, London (GB); Hans-Thomas Landsberger, London (GB)

(73) Assignee: Enoda Ltd., London (GB)

( * ) Notice: Subject to any disclaimer, the term of this patent is extended or adjusted under 35 U.S.C. 154(b) by 0 days.

(21) Appl. No.: 18/718,015

(22) PCT Filed: Dec. 2, 2022

(86) PCT No.: PCT/EP2022/084189
§ 371 (c)(1),
(2) Date: Jun. 7, 2024

(87) PCT Pub. No.: WO2023/104654
PCT Pub. Date: Jun. 15, 2023

(65) Prior Publication Data
US 2025/0054688 A1     Feb. 13, 2025

(30) Foreign Application Priority Data

Dec. 8, 2021   (GB) .................................. 2117697

(51) Int. Cl.
*H02J 3/28*     (2006.01)
*H01F 27/24*    (2006.01)
(Continued)

(52) U.S. Cl.
CPC ............... *H02J 3/28* (2013.01); *H01F 27/24* (2013.01); *H01F 30/12* (2013.01); *H02J 3/01* (2013.01); *H02J 3/24* (2013.01); *H02J 3/26* (2013.01)

(58) Field of Classification Search
CPC ........ H02J 3/28; H02J 3/01; H02J 3/32; H02J 3/26; H02J 13/00007; G05F 1/325;
(Continued)

(56) References Cited

U.S. PATENT DOCUMENTS

| 2,456,460 A | 12/1948 | Somerville |
| 2013/0021126 A1* | 1/2013 | Gajewski .............. H01F 29/146 336/5 |

(Continued)

FOREIGN PATENT DOCUMENTS

| CN | 201057591 Y | 5/2008 |
| EP | 2814045 A1 | 12/2014 |

(Continued)

*Primary Examiner* — Ryan Johnson
(74) *Attorney, Agent, or Firm* — Clark Hill PLC

(57) ABSTRACT

Power control apparatus and methods for modulating electrical power signals are discussed. In one example, a power control apparatus comprises a magnetic core comprising a first limb and a second limb. A primary winding is arranged around the first limb, and a secondary winding is arranged around the second limb. The power control apparatus comprises a voltage source converter having an AC connection and a DC connection, and a controller. The controller is configured to receive data associated with parameters of a first signal in the primary winding, compare the parameters of the first signal to parameters of a reference signal for the secondary winding, determine a harmonisation signal which, when applied to the first limb, causes a second signal in the secondary winding to approximate the reference signal. The controller is configured to cause application of the harmonisation signal to the first limb using the voltage source converter.

20 Claims, 12 Drawing Sheets

(51) Int. Cl.
*H01F 30/12* (2006.01)
*H02J 3/01* (2006.01)
*H02J 3/24* (2006.01)
*H02J 3/26* (2006.01)

(58) Field of Classification Search
CPC ... G05F 1/32; G05F 1/33; H01F 30/12; H01F 27/24
See application file for complete search history.

(56) References Cited

U.S. PATENT DOCUMENTS

2019/0204859 A1* 7/2019 Williams ................ H02M 5/10
2019/0312430 A1* 10/2019 Williams .............. H02M 5/451
2021/0175712 A1 6/2021 Williams et al.

FOREIGN PATENT DOCUMENTS

WO 2016183614 A1 11/2016
WO WO-2019178642 A1 * 9/2019 .............. H02M 1/42
WO 2022036410 A1 2/2022

* cited by examiner

POWER CONTROL APPARATUS AND METHOD

CROSS-REFERENCE TO AND INCORPORATION OF RELATED APPLICATION(S)

This application is a 371 U.S. National Stage application of International (PCT) application No. PCT/EP2022/084189, filed 2 Dec. 2022, published as WO2023/104654A1, which claims priority of GB patent application No. 2117697.9, filed 8 Dec. 2021, all of which are incorporated herein by reference in entirety.

TECHNICAL FIELD

The following disclosure relates to power control apparatus for modulating electrical power signals and methods for modulating electrical power signals.

BACKGROUND

Maintaining a reliable mains electricity supply requires the voltage and frequency of the electric power grid to be maintained within a target range. Generally, electricity must be consumed when it is generated, and consequently supply and demand must be balanced to maintain the target voltage and frequency of the electrical network.

Load balancing electrical power typically involves various techniques such as adjusting the output of dispatchable generation, i.e. sources of electricity that can be dispatched on demand at the request of power grid operators, such as fossil fuel-based power stations. Another example to aid in load balancing is by employing pumped-storage hydroelectricity to store energy in the form of gravitational potential energy.

The electrical power generation of non-dispatchable renewable energy sources such as wind power and solar photovoltaic cannot readily be controlled by power grid operators. The growing penetration rate of such non-dispatchable renewable energy sources increasingly presents a challenge for load balancing and hence frequency stability. For example, solar photovoltaic power production over the course of a day causes a timing imbalance between peak demand and energy production, commonly referred to as a duck curve.

Imbalance between generation and consumption can lead to energy losses and instability in the electric power grid due to waveform harmonics and voltage deviations, and ultimately to potential system failure in form of blackouts.

SUMMARY

Power control apparatuses disclosed herein enable optimisation of work and energy flow in time, space and mode by time variant magnetic flux modulation through near-field induction and high-speed dispatch. Such power control apparatuses can thus be used to assist in load balancing, power flow and quality optimisation.

There is provided a power control apparatus. The power control apparatus comprises a magnetic core comprising a first limb, a second limb, and a third limb. Each limb is arranged around a central axis, and each limb has a first end and a second end, wherein the first ends of the limbs are mutually connected at a first position along the central axis, and the second end of the limbs are mutually connected at a second position along the central axis. A primary winding is arranged around the first limb, and a first secondary winding may be arranged around the first limb. A second secondary winding is arranged around the second limb, and a third secondary winding is arranged around the third limb. The power control apparatus comprises a voltage source converter having an AC connection and a DC connection, and a controller. The controller is configured to receive data associated with parameters of a first signal in the primary winding, compare the parameters of the first signal to parameters of a respective reference signal for each of the second secondary winding and the third secondary winding, determine a harmonisation signal which, when applied to the first limb, causes a respective second signal in each of the second secondary winding and the third secondary winding to approximate the respective reference signal. The controller is configured to cause application of the harmonisation signal to the first limb using the voltage source converter.

The power control apparatus modulates electrical power signals, for example in a mains electrical system. For example, the reference signal may have a frequency of 50 Hz or 60 Hz. The parameters of the first signal may include one or more of voltage, current, frequency, phase angle and power factor of the first signal.

The AC connection of the voltage source converter may be electrically coupled to the primary winding, and the controller may be configured to cause application of the harmonisation signal to the first limb using the voltage source converter by causing application of the harmonisation signal to the primary winding using the voltage source converter. The AC connection of the voltage source converter may be electrically coupled to a tap along the primary winding. Alternatively to a tap, the power control apparatus may comprise a modulation winding arranged around the first limb.

Alternatively to a connection between the voltage source converter and the primary windings, the AC connection of the voltage source converter may be electrically coupled to the modulation winding, and the controller may be configured to cause application of the harmonisation signal to the first limb using the voltage source converter by causing application of the harmonisation signal to the modulation winding using the voltage source converter. Accordingly, the voltage source converter is electromagnetically coupled to the primary winding via the modulation winding. Applying the harmonisation signal in a tap in the primary winding rather than a modulation winding reduces the amount of copper required for windings, and reduces copper losses during operation of the power control apparatus. Further, configurations with taps in the windings require less surface area of the magnetic core to induce harmonisation signals than separate modulating windings.

The voltage source converter may be a first voltage source converter, and the power control apparatus may comprise a second voltage source converter having an AC connection and a DC connection. In other words, there may be a voltage source converter electrically coupled to each of the primary and secondary windings. The AC connection of the second voltage source converter may be electrically coupled to the second secondary winding. For example, the second voltage source converter may be electrically coupled to a tap along the second secondary winding. Alternatively to a tap, the AC connection of the second voltage source converter may be electrically coupled in parallel with a load which is electrically coupled to the second secondary winding. Alternatively to a connection between the voltage source converter and the primary and secondary windings, the power control apparatus may comprise a second modulation winding arranged around the limb, and the AC connection of the second voltage source converter may be electrically coupled to the second modulation winding. Accordingly, the voltage source converter is electromagnetically coupled to each of the primary and secondary windings via the modulation windings. Symmetric arrangements of components on each side of the magnetic core enable signal frequency stabilisation through the application of voltage droop control. In turn, this allows for temporal balance of demand (load) in relationship to supply in real-time achieved, even in the presence of negative power flow and highly non-linear loads on both sides of the power control apparatus.

The power control apparatus may comprise means for storing energy. The means for storing energy may be coupled to the DC connection of the voltage source converter. The means for storing energy may store electrical energy, for example, in capacitors or batteries. The means for storing energy may convert the energy into a different form such as rotational energy in flywheels, or thermal energy for thermal energy stores or heat pumps. The means for storing energy may convert the electrical energy to electrolyse water into hydrogen and oxygen, which can each be stored as fuel. Energy stored in the means for storing energy can be released at a later time, for example during peaks in demand in a mains electrical system. Accordingly, the means for storing energy may comprise one or more of: a capacitor, a battery, a flywheel, a thermal energy store, an electrolyser e.g. with a coupled hydrogen storage unit, a heat pump e.g. with a coupled thermal energy store, and an air compressor e.g. with a coupled air tank. If the power control apparatus comprises a second voltage source converter, the means for storing energy may also be coupled to the DC connection of the second voltage source converter. The means for storing energy enables energy to be stored for a temporal shift in power, i.e. load balancing.

The magnetic core may have a toroidal shape. The primary winding may be a first primary winding, and the power control apparatus may comprise a second primary winding arranged around the second limb, and a third primary winding arranged around the third limb. Each of the first primary winding, the second primary winding and the third primary winding may be arranged to carry a different phase of a three-phase AC signal.

The harmonisation signal may cause the second signal in each of the second secondary winding and the third secondary winding to approximate the respective reference signal by compensating for harmonics in the first signal so that the harmonics are removed or reduced in the respective second signal. The phase of the respective second signal may be locked to the phase of the first signal using a phase locked loop. Approximation of the respective reference signal by the respective second signal may comprise matching or substantially matching the parameters of the reference signal.

The harmonisation signal may cause the magnitude of the current in each of the first primary winding, the second primary winding and the third primary winding to be evenly redistributed between the first primary winding, the second primary winding and the third primary winding.

The voltage source converter(s) may comprise a silicon carbide-based metal-oxide semiconductor field-effect transistor and/or a gallium nitride transistor. The voltage source converter(s) may have a switching speed that is faster than the periodic duration, i.e. frequency, of the reference signal itself. For example, the voltage source converter(s) may have a switching speed of between $1/100$ second and $1/500$ second.

There is provided a computer-implemented method of modulating a respective second signal in each of a second secondary winding and a third secondary winding of a power control apparatus having a magnetic core comprising a first limb, a second limb, and a third limb. A primary winding is arranged around the first limb, and a first primary winding may be arranged around the first limb. The second secondary winding is arranged around the second limb, and the third secondary winding is arranged around the third limb. The first limb, second limb and third limb are each arc-shaped limbs, wherein each limb is arranged around a central axis, and each limb has a first end and a second end, wherein the first ends of the limbs are mutually connected at a first position along the central axis, and the second end of the limbs are mutually connected at a second position along the central axis. The method comprises: receiving data associated with parameters of a first signal in the primary winding; comparing the parameters of the first signal to parameters of a respective reference signal for each of the second secondary winding and the third secondary winding; determining a harmonisation signal which, when applied to the first limb, causes the respective second signal in each of the second secondary winding and the third secondary winding to approximate the respective reference signal; and causing application of the harmonisation signal to the first limb using a voltage source converter.

Causing application of the harmonisation signal to the first limb using the voltage source converter may comprise causing application of the harmonisation signal to the primary winding using the voltage source converter. Causing application of the harmonisation signal to the primary winding using the voltage source may comprise causing application of the harmonisation signal to a tap in the primary winding using the voltage source converter.

Causing application of the harmonisation signal to the first limb using the voltage source converter may comprise causing application of the harmonisation signal to a modulation winding using the voltage source converter, wherein the modulation winding is arranged around the first limb.

The harmonisation signal causes the respective second signal in each of the second secondary winding and the third secondary winding to approximate the respective reference signal by compensating for harmonics in the first signal so that the harmonics are removed or reduced in the respective second signal, i.e. by destructive interference.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION

The present disclosure relates to electrical power control apparatuses and methods that involve receiving input electrical energy in the form of an input signal having a voltage waveform and root-mean-square (RMS) voltage, and applying a harmonisation signal to output electrical energy in the form of an output signal having a desired voltage waveform and a desired output RMS voltage. For example, the waveform of the input signal may include noise and harmonic distortions which are suppressed in the output signal.

Figure 1:
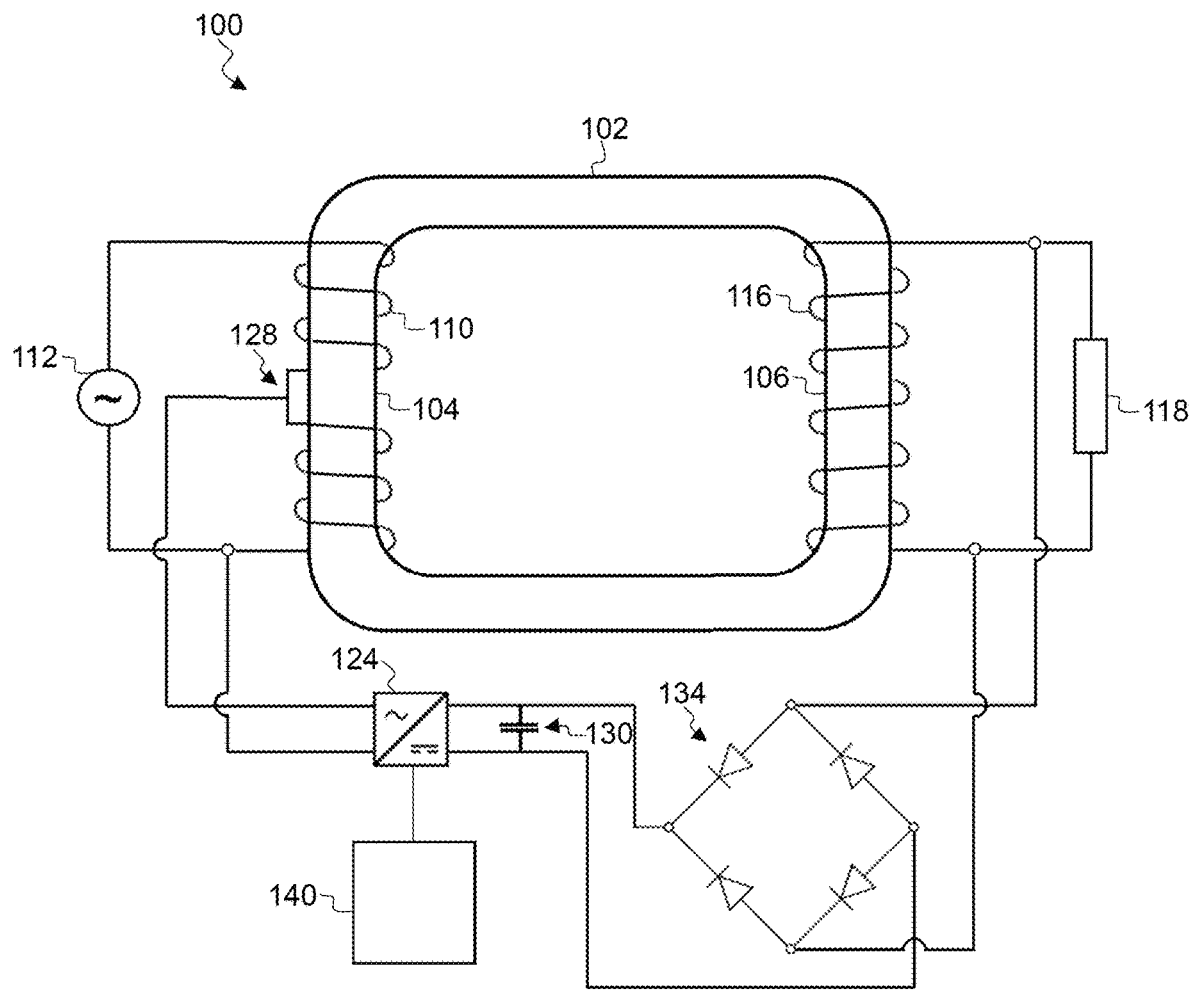
FIG. 1 is a schematic view of a power control apparatus.

With reference to FIG. 1, a power control apparatus 100 comprises a magnetic core 102 having a primary limb 104 and a secondary limb 106. The magnetic core 102 may be rectilinear or toroidal in shape. The primary limb 104 includes a primary winding 110 which is electrically coupled to an alternating current (AC) power supply 112. The secondary limb 106 includes a secondary winding 116 which is electrically coupled to a load 118. The load 118 may be one or more downstream loads which draw power from the power control apparatus 100. In the figures, the load 118 is illustrated as an idealised resistor. The magnetic core 102 together with the primary winding 110 and the secondary winding 116 are referred to collectively below as the electromagnetic subsystem.

The power control apparatus 100 comprises a voltage source converter 124 arranged to function as both a converter, to convert electric power from AC to direct current (DC), and as an inverter, to convert electric power from DC to AC. The voltage source converter 124 comprises a plurality of transistors and a plurality of capacitors. One example form of a known voltage source converter includes a multilevel converter arrangement. The multilevel converter arrangement includes converter bridges or cells connected in series, each converter cell including a pair of series connected transistors connected in parallel with a capacitor. The transistors may be silicon carbide-based metal-oxide semiconductor field-effect transistors, insulated-gate bipolar transistor and/or gallium nitride transistors. The AC terminals of the voltage source converter 124 are electrically coupled to a tap 128 in the primary winding 110. The DC terminals of the voltage source converter 124 are electrically coupled to a means for storing energy 130. In FIG. 1, the means for storing energy 130 is illustrated as a capacitor. Other example means for storing energy are discussed below.

The power control apparatus 100 comprises a bridge rectifier 134 arranged to convert electric power from AC to DC. The AC terminals of the bridge rectifier 134 are electrically coupled in parallel with the load 118. The DC terminals of the bridge rectifier 134 are electrically coupled to the means for storing energy 130.

When an electrical signal from the AC power supply 112 is introduced to the primary winding 110, an electromagnetic field is induced in the magnetic core 102. The electromagnetic field induces an electrical signal into the secondary winding 116. The number of turns of the windings of the primary winding 110 and the secondary winding 116 may be the same such that the voltage of the input electrical signal and the voltage of the output electrical signal are the same. In other examples, the secondary winding 116 may have fewer turns than the primary winding 110 such that the output voltage is stepped down. In other examples, the secondary winding 116 may have more turns than the primary winding 110 such that the output voltage is stepped up.

The power control apparatus 100 comprises a controller 140 which may be communicatively coupled to the voltage source converter 124. The controller 140 is configured to receive data associated with parameters of the input electrical signal in the primary winding 110. For example, the parameters may include voltage, current, frequency, phase angle and/or power factor. The controller may receive the data from one or more voltage and/or current sensors.

The controller 140 is configured to compare the parameters of the input signal to parameters of a reference signal for the secondary winding 116. The reference signal comprises an idealised waveform with desired parameters of the output signal, for example, without noise or harmonics. The controller 140 is configured to determine a harmonisation signal which, when applied to the primary winding 110, causes the output electrical signal in the secondary winding 116 to approximate the reference signal, for example, by destructive interference. The controller 140 is configured to cause application of the harmonisation signal to the primary winding 110 using the voltage source converter 124. Accordingly, once the harmonisation signal is applied, the output electrical signal in the secondary winding 116 is substantially identical to the reference signal.

The energy balance in the electromagnetic subsystem at a time, $t_1$, with respect to the signal is given by:

$$E^P(t_1) = E^S(t_1) - L(t_1)$$

where $E^P$ and $E^S$ denote the energy in the primary side and secondary side, respectively. L denotes an energy loss which occurs across the electromagnetic subsystem which can be represented by:

$$L(t_1) = L_{SI}(t_1) + L_{EMS}(t_1)$$

$L_{SI}$ represents loss due to signal inequality between primary side and secondary side, and $L_{EMS}$ denotes general electromagnetic losses of the electromagnetic subsystem, for example, due to eddy current losses or stray losses. $L_{SI}$ can be a significant proportion of total energy loss, in particular in the presence of non-linear loads at the primary side which may be caused by higher-order harmonic content in the current on the primary side and phase shift between the input signal and the output signal.

Application of the harmonisation signal enables the recovery of $L_{SI}$. The recovered energy within a given time increment $\Delta t_1$, $L_{SI}(t_1+\Delta t_1)$, can be buffered in the plurality of capacitors of the voltage source converter 124. The time increment $\Delta t_1$ is smaller than the periodic duration of the reference signal, e.g. smaller than 1/50 second or 1/60 second. For example, $\Delta t_1$ may be between 1/100 second and 1/500 second.

A portion of the energy buffered in the plurality of capacitors can be used to provide power to apply the harmonisation signal at a later time $t_2$, thereby supporting power factor correction, voltage regulation, power quality management, and/or phase balancing as part of system frequency stabilisation in the output signal. Additionally, energy buffered in the plurality of capacitors can be transferred to the means for storing energy 130. The means for storing energy 130 may store electrical energy, for example, in capacitors or batteries. The means for storing energy 130 may convert the energy into a different form such as rotational energy in flywheels, or thermal energy for thermal energy stores or heat pumps. In a particular example, the electrical energy can be used to electrolyse water into hydrogen and oxygen, which can each be stored as fuel. Energy stored in the means for storing energy 130 can be released at a later time, for example during peaks in demand in a mains electrical system. Accordingly, the power control apparatus enables optimisation of work and energy flow in time, space and mode enabled by time variant magnetic flux modulation through near-field induction and high-speed dispatch.

Additionally, appropriate sizing of the plurality of capacitors of the voltage source converter 124 such that the plurality of capacitors and/or means for storing energy 130 are able to store more electrical energy than is required for applying harmonisation signals, i.e. approximately 20% of the total power rating of the electromagnetic subsystem, enables electrical energy to be drawn from the secondary side of the electromagnetic subsystem into the voltage source converter 124, for example during times of surplus energy generation in a mains electrical system.

Whilst the foregoing discussion is made with reference to the power control apparatus 100, various configurations of power control apparatuses also work analogously to enable modulation of electrical power signals. A selection of these configurations is discussed below.

Figure 2:
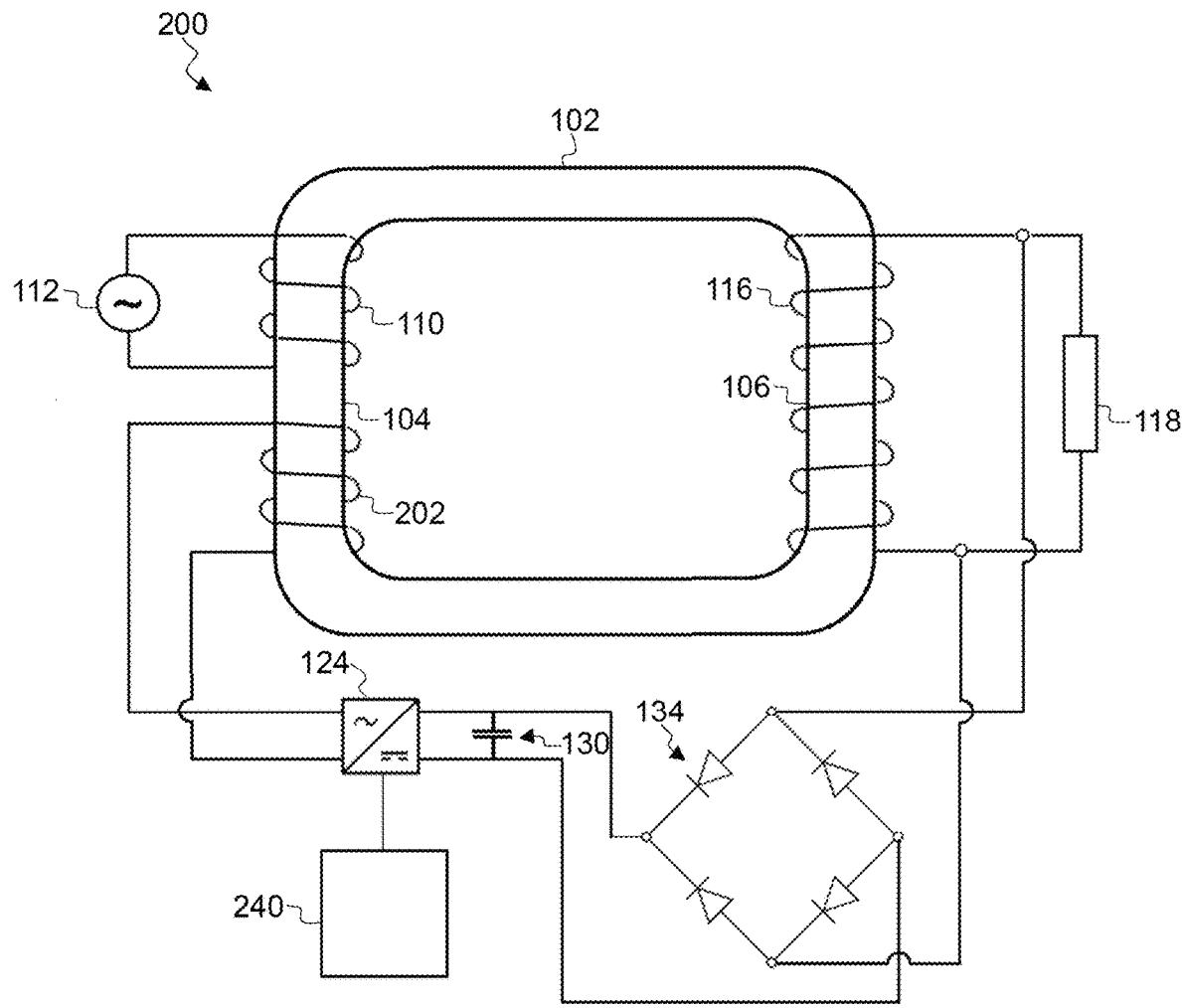
FIG. 2 is a schematic view of a power control apparatus.

With reference to FIG. 2, a power control apparatus 200 comprises a magnetic core 102 having a primary limb 104 and a secondary limb 106. The primary limb 104 includes a primary winding 110 which is electrically coupled to an AC power supply 112. The primary limb 104 also includes a modulation winding 202. The secondary limb 106 includes a secondary winding 116 which is electrically coupled to a load 118. The power control apparatus 200 comprises a voltage source converter 124 arranged to function as both a converter and as an inverter. The voltage source converter 124 is substantially the same as the voltage source converter 124 of the power control apparatus 100.

The AC terminals of the voltage source converter 124 are electrically coupled to the modulation winding 202. The DC terminals of the voltage source converter 124 are electrically coupled to a means for storing energy 130. The power control apparatus 200 comprises a bridge rectifier 134 arranged to convert electric power from AC to DC. The AC terminals of the bridge rectifier 134 are electrically coupled in parallel with the load 118. The DC terminals of the bridge rectifier 134 are electrically coupled to the means for storing energy 130.

The power control apparatus 200 comprises a controller 240 which may be communicatively coupled to the voltage source converter 124. The controller 240 is configured to receive data associated with parameters of the input electrical signal in the primary winding 110. The controller 240 is configured to compare the parameters of the input signal to parameters of a reference signal for the secondary winding 116. The reference signal comprises an idealised waveform with desired parameters of the output signal, for example, without noise or harmonics. The controller 240 is configured to determine a harmonisation signal which, when applied to the modulation winding 202, causes the output electrical signal in the secondary winding 116 to approximate the reference signal, for example, by destructive interference. The controller 240 is configured to cause application of the harmonisation signal to the modulation winding 202 using the voltage source converter 124. Accordingly, once the harmonisation signal is applied, the output electrical signal in the secondary winding 116 is substantially identical to the reference signal.

Applying the harmonisation signal in a tap in the primary winding 110, e.g. tap 128 rather than a modulation winding reduces the amount of copper required for windings, and reduces copper losses during operation of the power control apparatus. Further, configurations with taps in the windings require less surface area of the magnetic core to induce harmonisation signals than separate modulating windings.

Alternative configurations of the secondary side of power control apparatus are described with reference to FIGS. 3 and 4.

Figure 3:
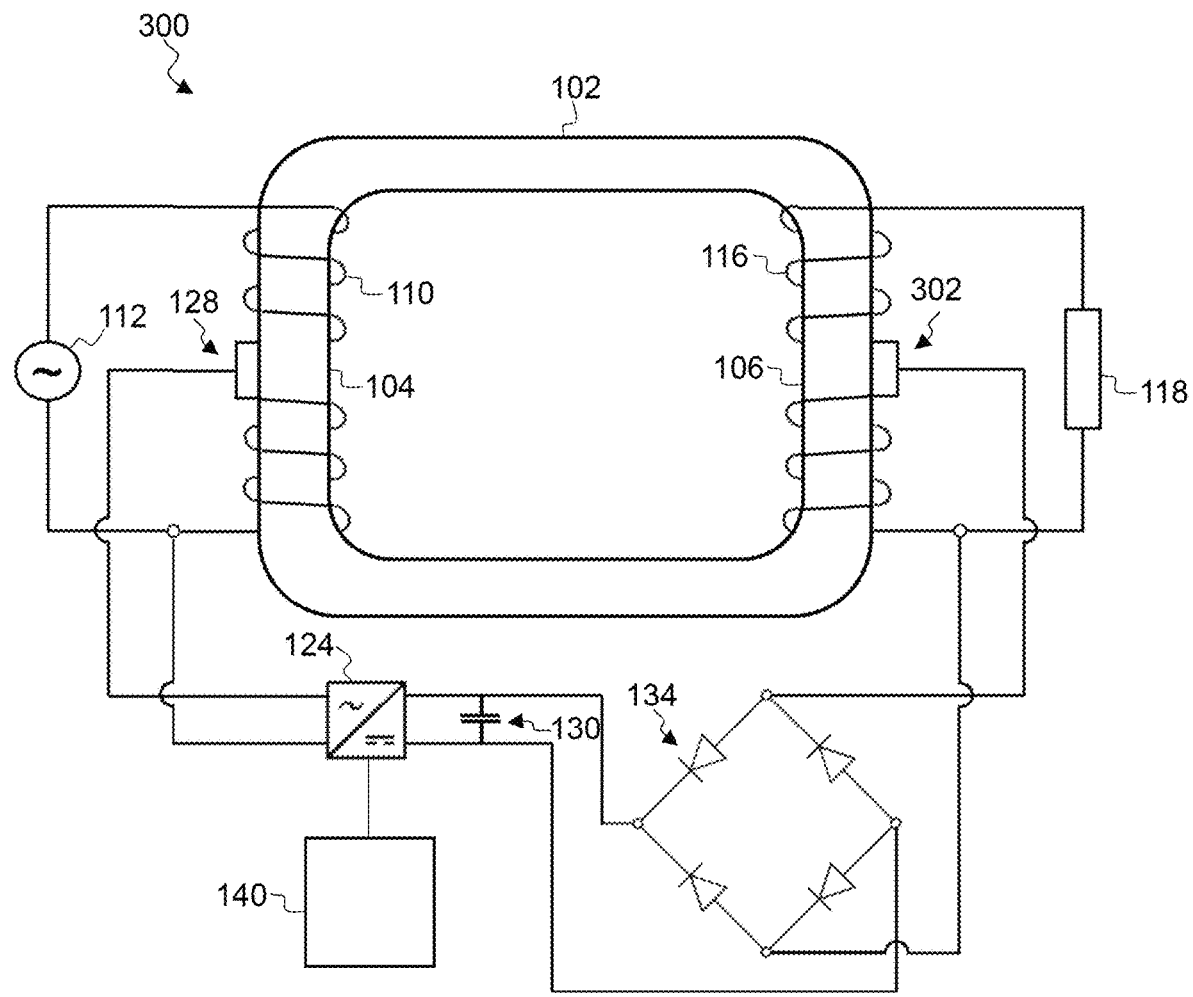
FIG. 3 is a schematic view of a power control apparatus.

With reference to FIG. 3, a power control apparatus 300 is substantially the same as the power control apparatus 100. In the power control apparatus 300, the AC terminals of the bridge rectifier 134 are electrically coupled to a tap 302 in the secondary winding 116.

Figure 4:
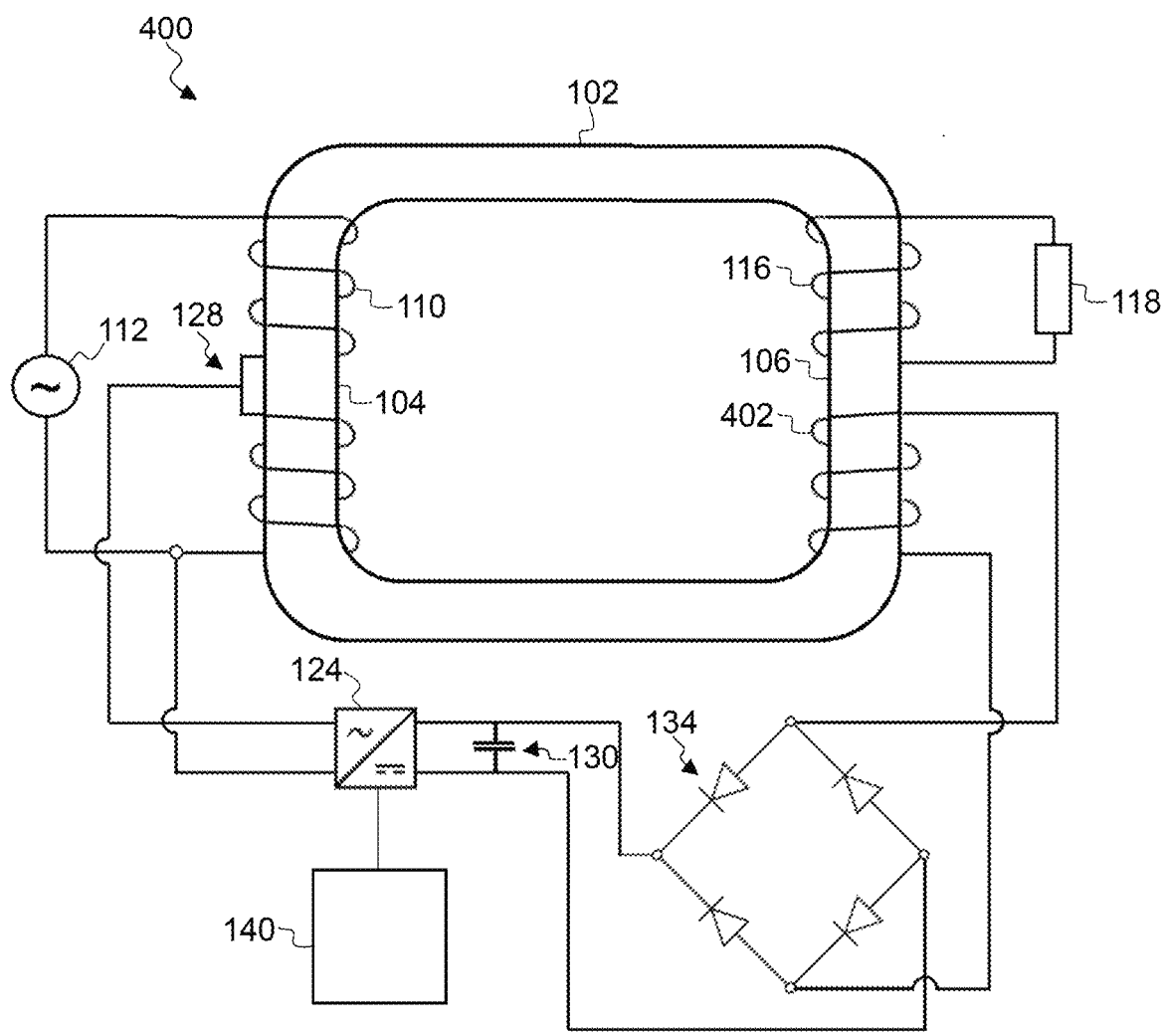
FIG. 4 is a schematic view of a power control apparatus.

With reference to FIG. 4, a power control apparatus 400 is substantially the same as the power control apparatus 100. The secondary limb 106 of the power control apparatus 400 includes an output winding 402. In the power control apparatus 400, the AC terminals of the bridge rectifier 134 are electrically coupled to the output winding 402.

Both the power control apparatus 300 and the power control apparatus 400 enable the voltage input to the bridge rectifier 134 to be different to the voltage in the secondary winding 116.

Alternative configurations of the power control apparatus include a voltage source converter associated with each side of the magnetic core. Symmetric arrangements of components on each side of the magnetic core enable signal frequency stabilisation through the application of voltage droop control. In turn, this allows for temporal balance of demand, i.e. load, in relationship to supply in real-time which can be achieved even in the presence of negative power flow and highly non-linear loads on both sides of the power control apparatus.

Figure 5:
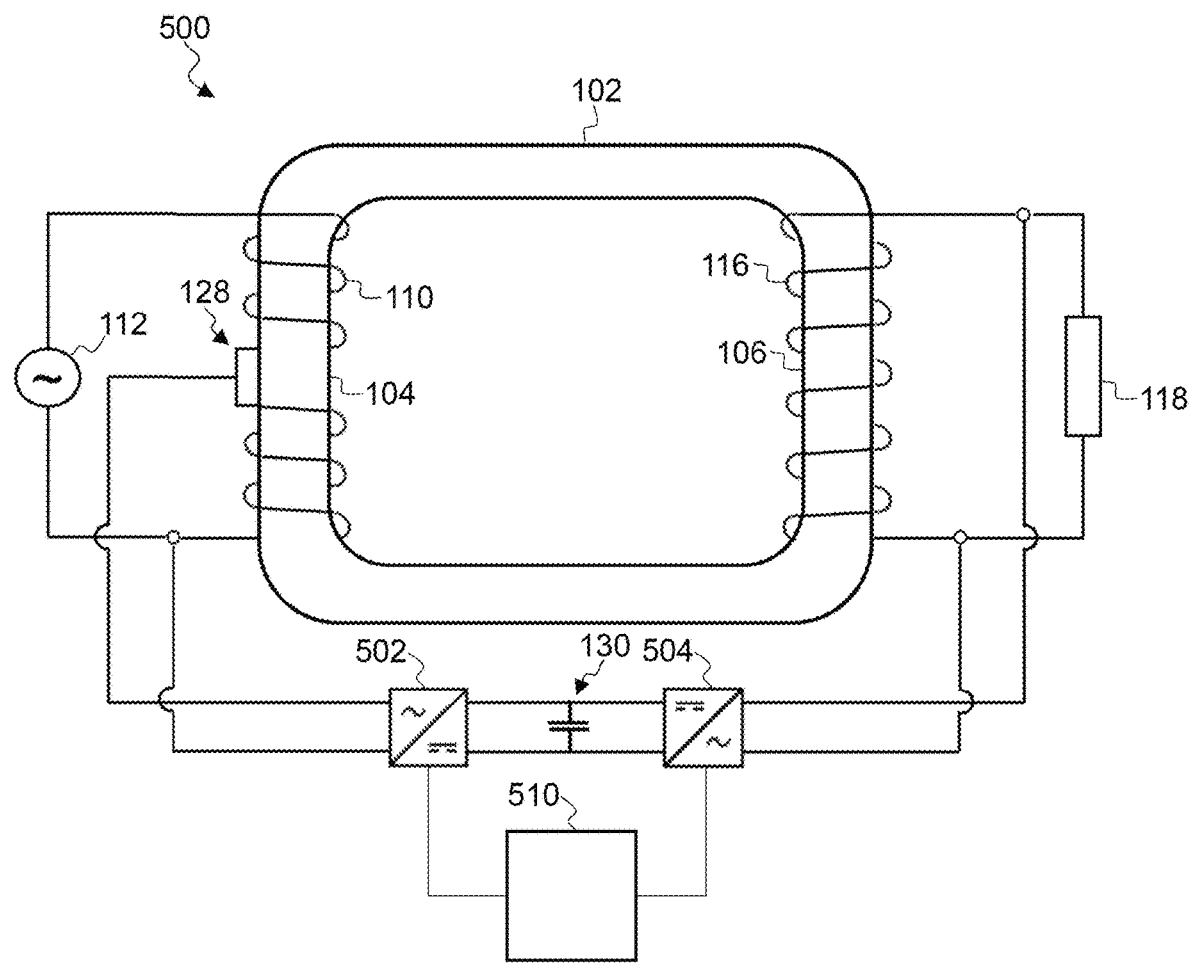
FIG. 5 is a schematic view of a power control apparatus.

With reference to FIG. 5, a power control apparatus 500 comprises a magnetic core 102 having a primary limb 104 and a secondary limb 106. The primary limb 104 includes a primary winding 110 which is electrically coupled to an AC power supply 112. The secondary limb 106 includes a secondary winding 116 which is electrically coupled to a load 118.

The power control apparatus 500 comprises a first voltage source converter 502 and a second voltage source converter 504, each arranged to function as both a converter and as an inverter. The AC terminals of the first voltage source converter 502 are electrically coupled to a tap 128 in the primary winding 110. The DC terminals of the first voltage source converter 502 are electrically coupled to a means for storing energy 130. The AC terminals of the second voltage source converter 502 are electrically coupled in parallel with the load 118. The DC terminals of the second voltage source converter 504 are electrically coupled to a means for storing energy 130.

The power control apparatus 500 comprises a controller 510 which may be communicatively coupled to both the first voltage source converter 502 and the second voltage source converter 504. The controller 510 is configured to receive data associated with parameters of the input electrical signal in the primary winding 110.

The controller 510 is configured to compare the parameters of the input signal to parameters of a reference signal for the secondary winding 116. The reference signal comprises an idealised waveform with desired parameters of the output signal, for example, without noise or harmonics. The controller 510 is configured to determine a harmonisation signal which, when applied to the primary winding 110, causes the output electrical signal in the secondary winding 116 to approximate the reference signal, for example, by destructive interference. The controller 510 is configured to cause application of the harmonisation signal to the primary winding 110 using the first voltage source converter 502. Accordingly, once the harmonisation signal is applied, the output electrical signal in the secondary winding 116 is substantially identical to the reference signal. The second voltage source converter 504 enables the power control apparatus 500 to buffer additional energy.

Figure 6:
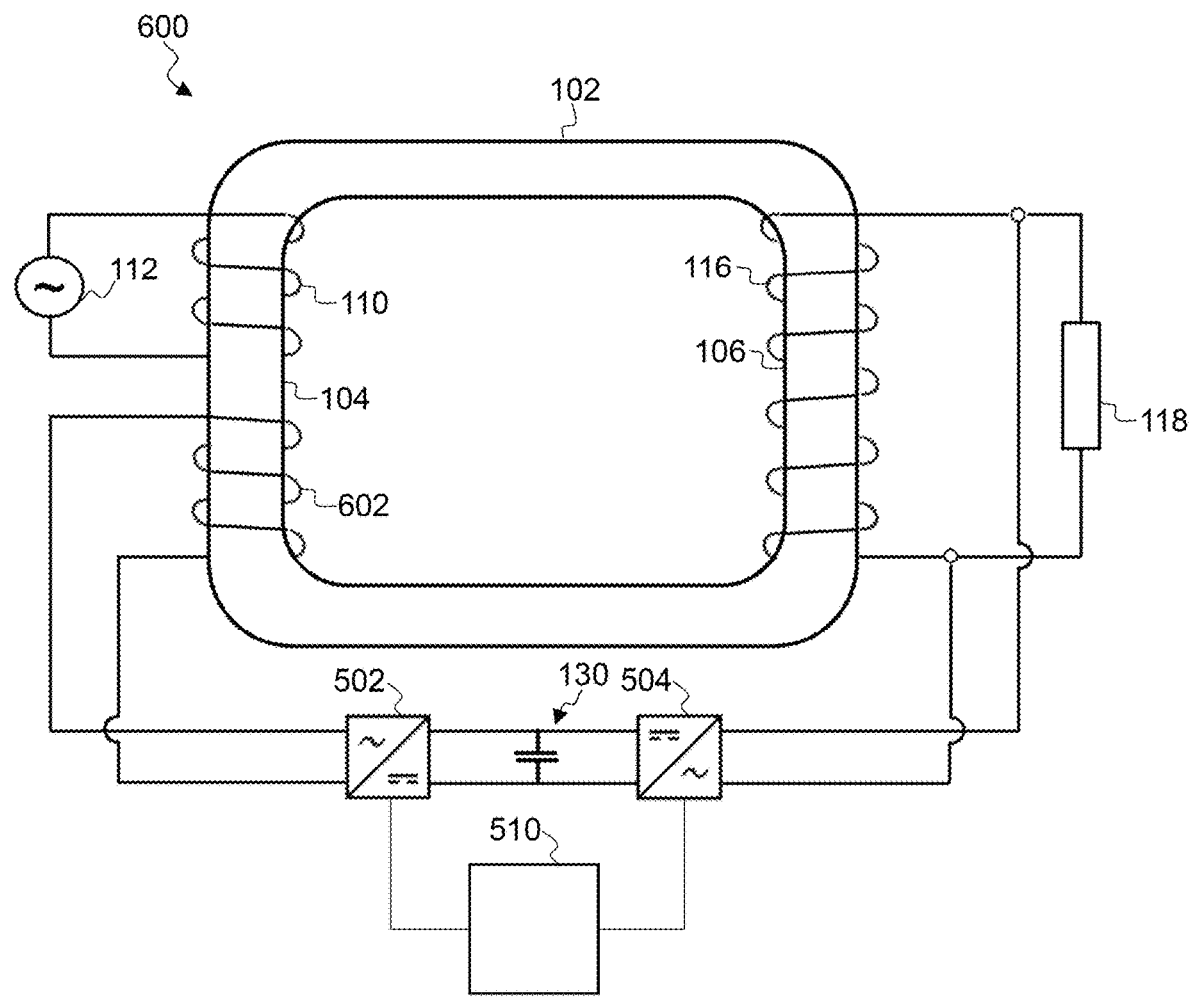
FIG. 6 is a schematic view of a power control apparatus.

In an alternative configuration discussed with reference to FIG. 6, a power control apparatus 600 is substantially the same as the power control apparatus 500. The primary limb 104 of the power control apparatus 600 includes a modulation winding 602. In the power control apparatus 600, the AC terminals of the first voltage source converter 502 are electrically coupled to the modulation winding 602.

Figure 7:
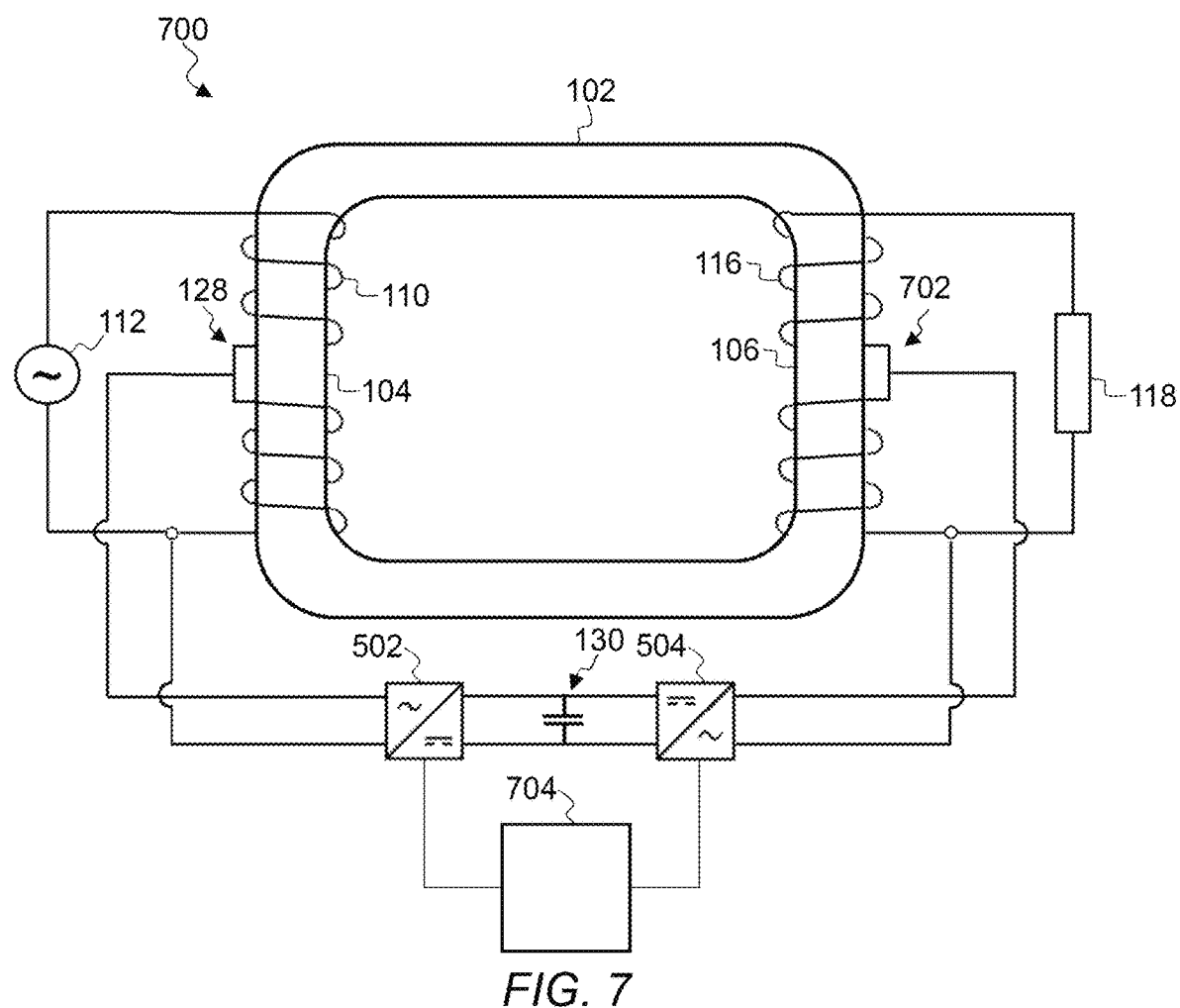
FIG. 7 is a schematic view of a power control apparatus.

With reference to FIG. 7, a power control apparatus 700 comprises a magnetic core 102 having a primary limb 104 and a secondary limb 106. The primary limb 104 includes a primary winding 110 which is electrically coupled to an AC power supply 112. The secondary limb 106 includes a secondary winding 116 which is electrically coupled to a load 118.

The power control apparatus 700 comprises a first voltage source converter 502 and a second voltage source converter 504, each arranged to function as both a converter and as an inverter. The AC terminals of the first voltage source converter 502 are electrically coupled to a tap 128 in the primary winding 110. The DC terminals of the first voltage source converter 502 are electrically coupled to a means for storing energy 130. The AC terminals of the second voltage source converter 502 are electrically coupled in parallel with the load 118. The DC terminals of the second voltage source converter 504 are electrically coupled to a tap 702 in the secondary winding 116.

The power control apparatus 700 comprises a controller 704 which may be communicatively coupled to both the first voltage source converter 502 and the second voltage source converter 504.

The controller 704 is configured to receive data associated with parameters of a first signal in the primary winding 110. The controller 704 is configured to compare the parameters of the first signal to parameters of a reference signal for the secondary winding 116. The reference signal comprises an idealised waveform with desired parameters of the second signal, for example, without noise or harmonics. The controller 704 is configured to determine a harmonisation signal which, when applied to the primary winding 110, causes the second signal in the secondary winding 116 to approximate the reference signal, for example, by destructive interference. The controller 704 is configured to cause application of the harmonisation signal to the primary winding 110 using the first voltage source converter 502. Accordingly, once the harmonisation signal is applied, the second signal in the secondary winding 116 is substantially identical to the reference signal.

The controller 704 may be configured to receive data associated with parameters of a third signal in the secondary winding 116. The controller 704 is configured to compare the parameters of the third signal to parameters of a reference signal for the primary winding 110. The reference signal comprises an idealised waveform with desired parameters of the second signal, for example, without noise or harmonics. The controller 704 is configured to determine a harmonisation signal which, when applied to the secondary winding 116, causes a fourth signal in the primary winding 110 to approximate the reference signal, for example, by destructive interference. The controller 704 is configured to cause application of the harmonisation signal to the secondary winding 116 using the second voltage source converter 504. Accordingly, once the harmonisation signal is applied, the fourth signal in the primary winding 110 is substantially identical to the reference signal.

Accordingly, the power control apparatus 700 has a symmetric arrangement such that either the primary side or the secondary side can receive an input signal.

Figure 8:
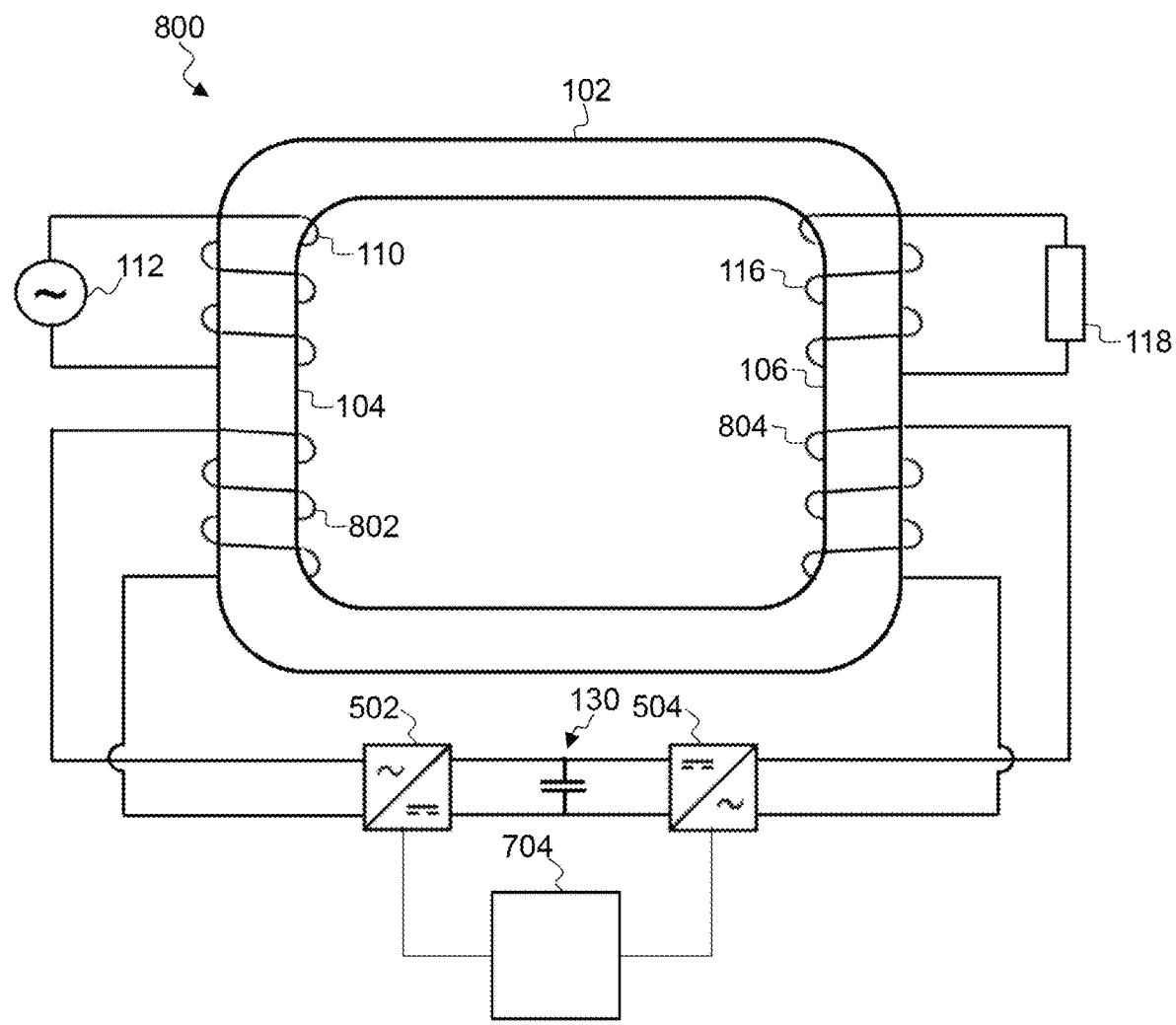
FIG. 8 is a schematic view of a power control apparatus.

In an alternative configuration discussed with reference to FIG. 8, a power control apparatus 800 is substantially the same as the power control apparatus 700. The primary limb 104 of the power control apparatus 800 includes a first modulation winding 802. The secondary limb 106 of the power control apparatus 800 includes a second modulation winding 804. The AC terminals of the first voltage source converter 502 are electrically coupled to the first modulation winding 802. The AC terminals of the second voltage source converter 504 are electrically coupled to the second modulation winding 804.

The AC power supply 112 of any of the power control apparatuses described above may be single phase. In order to support polyphase AC signals, a power control system may comprise a plurality of power control apparatuses, one power control apparatus per phase. For example, for a three-phase mains electrical system, the power control system may comprise three power control apparatuses described above but with a unified controller communicatively coupled to each of the voltage source converters, rather than three independent controllers. The unified controller maintains the output signal for each phase independently. The voltage source converters of the power control system may be interconnected, for example with busbars. This enables power to be transferred between the power control apparatuses in order to balance power across all three phases.

Alternatively to one power control apparatus per phase, a multiphase magnetic core may be employed. For example, an E-I magnetic core, or a magnetic core as described in UK patent application 2115649.2, which is hereby incorporated by reference in its entirety. An example three-phase magnetic core of UK patent application 2115649.2 is described in brief with reference to FIGS. 9A to 9C.

Figure 9A:
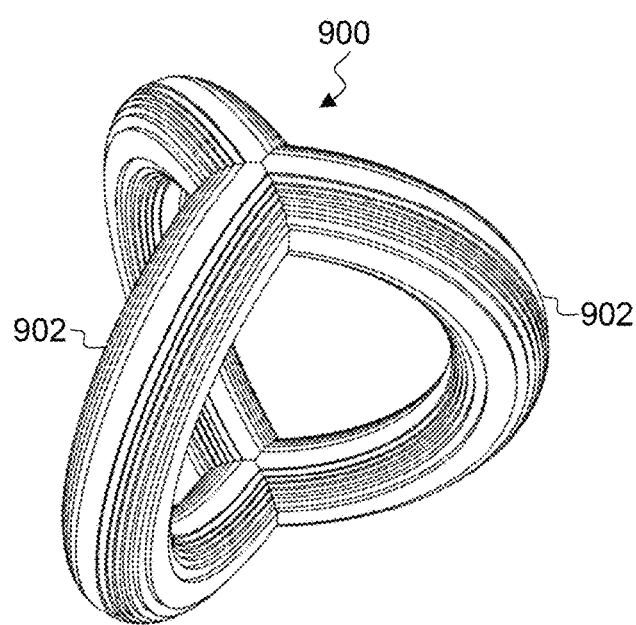
FIG. 9A is a schematic view of a magnetic core.
Figure 9B:
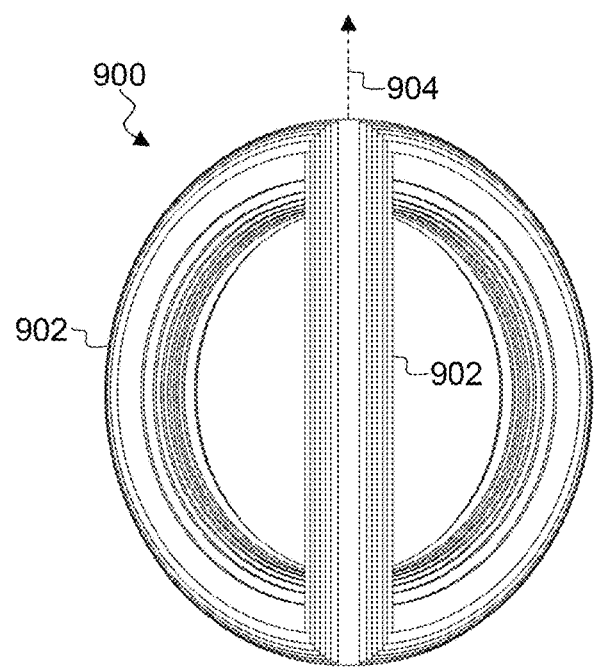
FIG. 9B is a schematic side view of the magnetic core of FIG. 9A.
Figure 9C:
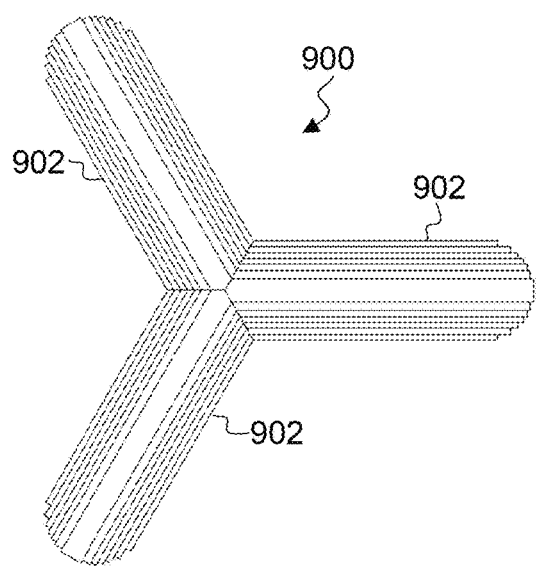
FIG. 9C is a schematic top view of the magnetic core of FIG. 9A.

With reference to FIGS. 9A to 9C, a magnetic core 900 comprises three arc-shaped limbs 902 which are evenly spaced around a central axis 904. Each limb 902 is substantially identical. The arc-shaped limbs 902 are 180 degree arcs. Each limb 902 has a first end and a second end. Each first end has a first edge which lies along the central axis 904. Each second end has a second edge which lies along the central axis. The first ends are joined together, and the second ends are joined together. Each limb 902 may be wound with one or more of a primary, a secondary and a modulating winding (not illustrated in FIGS. 9A to 9C). Each limb 902 may comprise a plurality of electrical steel strips that are bent and laminated together. The use of thin steel laminations reduces power losses caused by eddy currents induced when sinusoidal voltage is applied to the windings. The width of the laminated electrical steel strips may be different in an arrangement that leads to the limbs 902 having a cross section that approximates a circle. Alternatively, the width of the laminated electrical steel strips in the limbs 902 may be constant, such that the limbs have a rectangular cross section. The windings may be distributed windings or concentric windings. Advantageously, distributed windings provide superior leakage impedance and better thermal performance compared to concentric windings. Further, an improved distribution of the magnetic field across the three-phase core is achieved in a design with a distributed wind topology. Distributed windings maintain a lower level of leakage impedance, under identical operating conditions, maximising the voltage control range of the control system to achieve avoiding magnetic saturation of the ferromagnetic material. For example, there may be grid code requirements on the impedance percentage, 2% to 8%.

Figure 10:
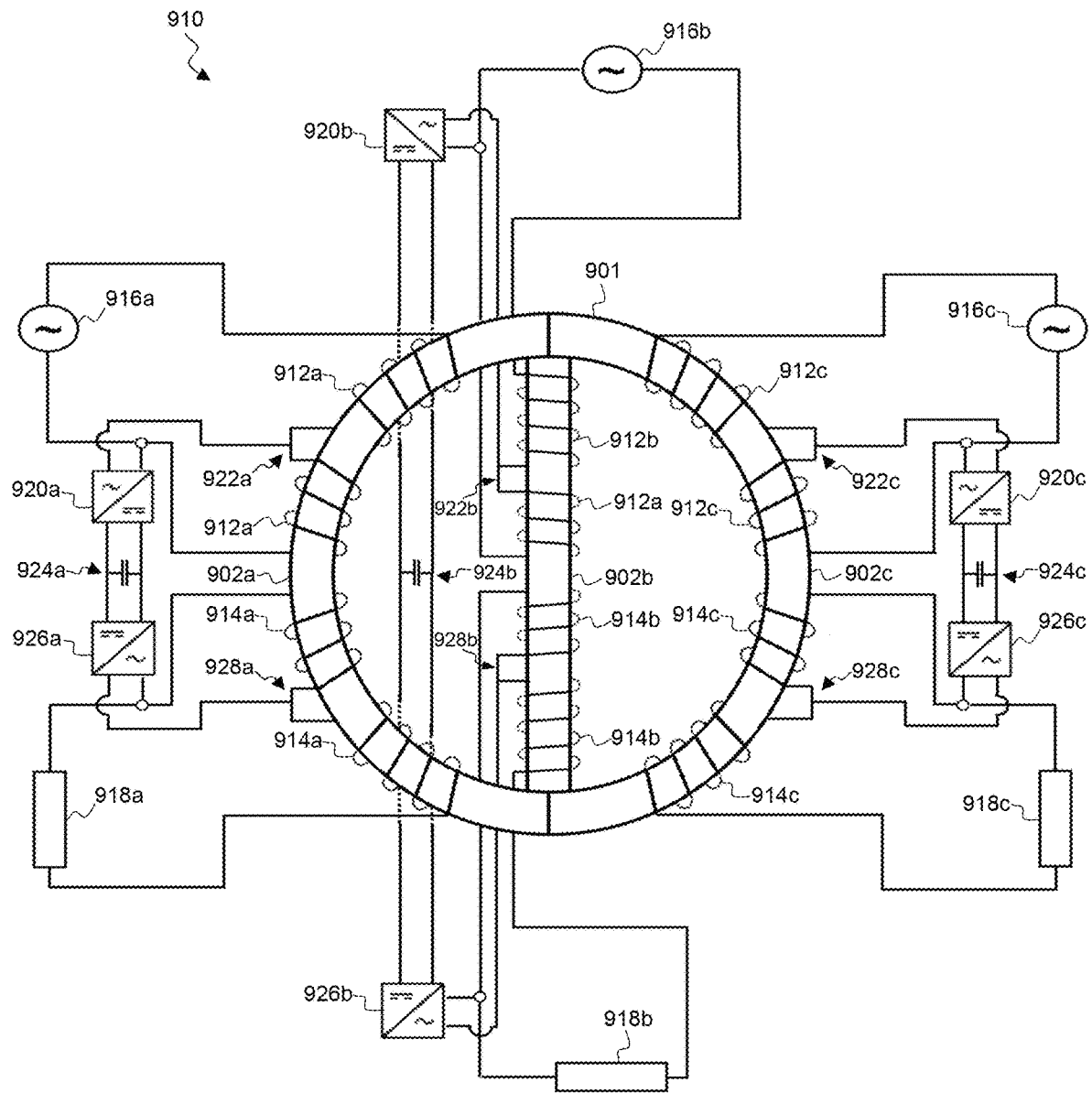
FIG. 10 is a schematic view of a power control apparatus.

With reference to FIG. 10, a power control apparatus 910 comprises a magnetic core 901. The magnetic core 901 is a three-phase magnetic core such as the magnetic core 900. The magnetic core 901 comprises a first limb 902a, a second limb 902b and a third limb 902c. The first limb 902a includes a first primary winding 912a and a first secondary winding 914a. The second limb 902b includes a second primary winding 912b and a second secondary winding 914b. The third limb 902c includes a third primary winding 912c and a third secondary winding 914c.

The first primary winding 912a is electrically coupled to a first AC power supply 916a having a first phase. The second primary winding 912b is electrically coupled to a second AC power supply 916b having a second phase. The third primary winding 912c is electrically coupled to a third AC power supply 916c having a third phase. The AC power supplies 916a, 916b, 916c may each carry one phase of a three-phase mains electricity supply.

The first secondary winding 914a is electrically coupled to a first load 918a. The second secondary winding 914b is electrically coupled to a second load 918b. The third secondary winding 914c is electrically coupled to a third load 918c. The loads 918a, 918b, 918c may be one or more downstream loads which draw power from the power control apparatus 910, for example, a three-phase electric power grid.

The power control apparatus 910 comprises six voltage source converters each arranged to function as both a converter and as an inverter. Each voltage source converter comprises a plurality of transistors and a plurality of capacitors. A first voltage source converter 920a includes AC terminals and DC terminals. The AC terminals of the first voltage source converter 920a are electrically coupled to a tap 922a in the first primary winding 912a. The DC terminals of the first voltage source converter 920a are electrically coupled to a first means for storing energy 924a. A second voltage source converter 926a includes AC terminals and DC terminals. The AC terminals of the second voltage source converter 926a are electrically coupled to a tap 928a in the first secondary winding 914a. The DC terminals of the second voltage source converter 926a are electrically coupled to the first means for storing energy 924a. A third voltage source converter 920b includes AC terminals and DC terminals. The AC terminals of the third voltage source converter 920b are electrically coupled to a tap 922b in the second primary winding 912b. The DC terminals of the third voltage source converter 920b are electrically coupled to a second means for storing energy 924b. A fourth voltage source converter 926b includes AC terminals and DC terminals. The AC terminals of the fourth voltage source converter 926b are electrically coupled to a tap 928b in the second secondary winding 914b. The DC terminals of the fourth voltage source converter 926b are electrically coupled to the second means for storing energy 924b. A fifth voltage source converter 920c includes AC terminals and DC terminals. The AC terminals of the fifth voltage source converter 920c are electrically coupled to a tap 922c in the third primary winding 912c. The DC terminals of the fifth voltage source converter 920c are electrically coupled to a third means for storing energy 924c. A sixth voltage source converter 926c includes AC terminals and DC terminals. The AC terminals of the sixth voltage source converter 926c are electrically coupled to a tap 928c in the third secondary winding 914c. The DC terminals of the sixth voltage source converter 926c are electrically coupled to the third means for storing energy 924c. The six voltage source converters may be interconnected, for example with busbars. This enables power to be transferred between the voltage source converters in order to balance power across all three phases. The three means for storing energy 924a, 924b, 924c may be interconnected, for example with busbars. The three means for storing energy 924a, 924b, 924c may be the same means for storing energy.

Some or all of the voltage source converters may be connected to modulation windings on a limb instead of being electrically coupled to a tap in the primary winding or second winding.

When an electrical signal from one of the AC power supplies 916a, 916b, 916c is introduced to the primary winding of its respective limb, an electromagnetic field is induced in the magnetic core 901. The electromagnetic field in the magnetic core 901 induces an electrical signal into the secondary windings of the other two limbs.

The power control apparatus 910 comprises a controller (not illustrated) which may be communicatively coupled to each of the six voltage source converters 920a, 920b, 920c, 926a, 926b, 926c. The controller is configured to receive data associated with parameters of the input electrical signal in each of the primary windings 912a, 912b, 912c. For example, the parameters may include voltage, current, frequency, phase angle and/or power factor. The controller may receive the data from one or more voltage and/or current sensors.

The controller is configured to compare the parameters of the input signal to parameters of a reference signal for each of the secondary windings 914a, 914b, 914c. The reference signals each comprise an idealised waveform with desired parameters of the output signal in each of the secondary windings, for example, without noise or harmonics. The controller is configured to determine a set of harmonisation signals comprising a harmonisation signal for at least one of the primary windings 912a, 912b, 912c. When the set of harmonisation signals is applied to at least one primary winding, the output electrical signal in the secondary windings 914a, 914b, 914c approximate their respective reference signal, for example, by destructive interference. The controller is configured to cause application of the set of harmonisation signals to the primary windings 912a, 912b, 912c using the voltage source converters 920a, 920b, 920c. Accordingly, once the set of harmonisation signals is applied, the output electrical signals in the secondary windings 914a, 914b, 914c are substantially identical to their respective reference signals.

With balanced loads between the three phases, third-order harmonics can be cancelled. The controller may also be configured to remove other harmonics and provide additional voltage control with unbalanced loads by presenting them to the electric power grid as balanced. This is achieved by controlling amplitude and phase of the harmonisation signals in the set of harmonisation signals independently for each limb. This provides the power control apparatus with six degrees of freedom to achieve different control objectives. One possible control objective is to vary the secondary voltage on each limb by an equal percentage, but to leave the ratio of the primary currents for the corresponding limbs unchanged compared to passive, i.e. unmodulated, operation of the power control apparatus. Another possible control objective is to vary the output voltage on each limb, but simultaneously redistribute the primary currents. One possible choice of redistribution is to equalize the magnitude of the three primary currents, keeping their phases 120 and 240 degrees apart, thus achieving substantially equal load balancing from the perspective of the primary side.

Using a single magnetic core for modulating a polyphase AC signal rather than a single-phase magnetic core for each phase to modulate the same polyphase AC signal enables modulation of inter-phase harmonics and noise, in addition to intra-phase harmonics and noise. Use of a polyphase magnetic core also reduces the physical amount of iron required compared to multiple single-phase cores. Further, load and non-load losses can be reduced in a polyphase magnetic core compared to multiple single-phase cores.

Figure 11:
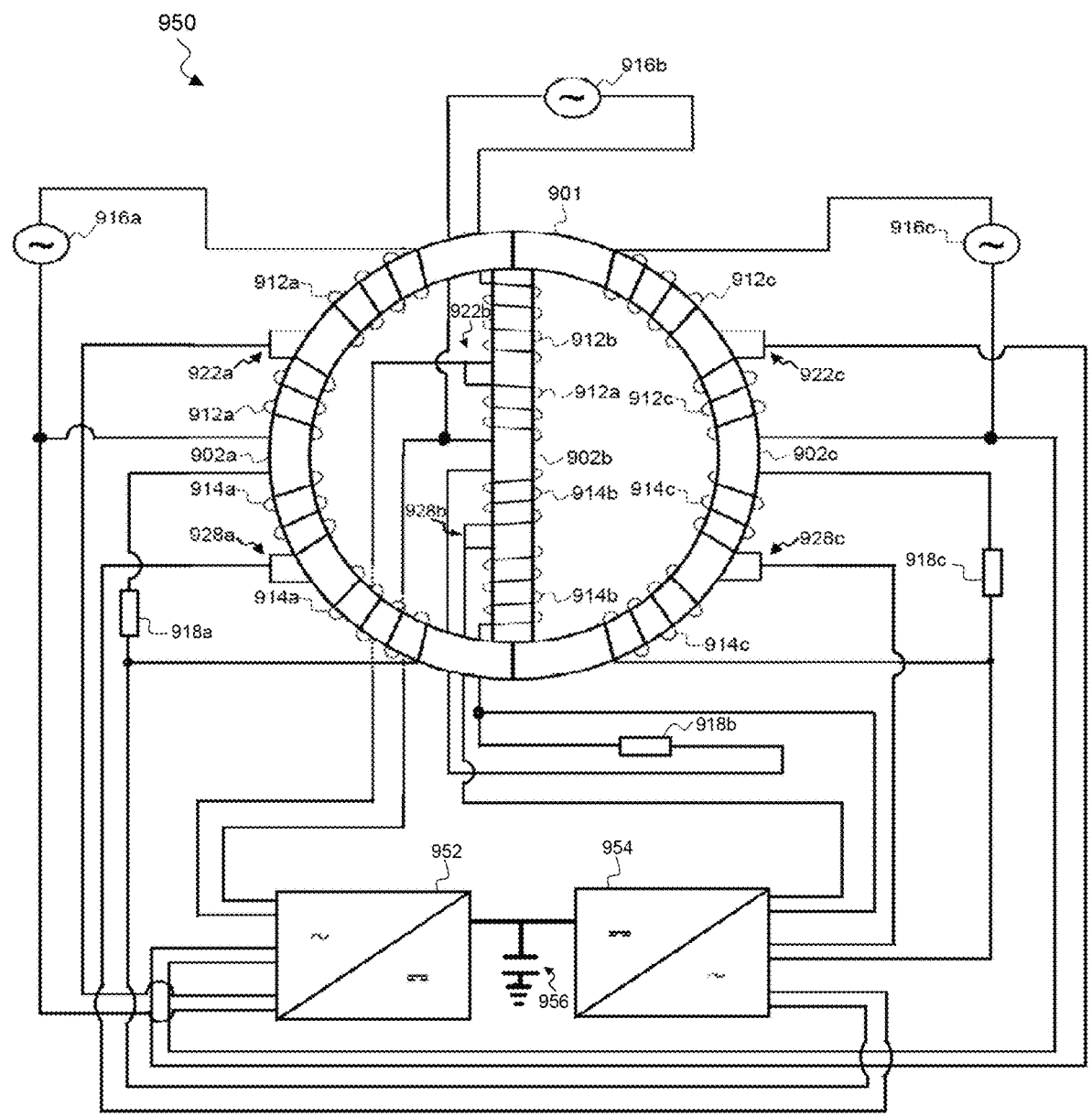
FIG. 11 is a schematic view of a power control apparatus.

Alternatively to a pair of voltage source converters for each phase, a pair of three-phase voltage source converters may be used. With reference to FIG. 11, a power control apparatus 950 is substantially the same as the power control apparatus 910, and comprises a magnetic core 901. The magnetic core 901 is a three-phase magnetic core such as the magnetic core 900. The magnetic core 901 comprises a first limb 902a, a second limb 902b and a third limb 902c. The first limb 902a includes a first primary winding 912a and a first secondary winding 914a. The second limb 902b includes a second primary winding 912b and a second secondary winding 914b. The third limb 902c includes a third primary winding 912c and a third secondary winding 914c.

The first secondary winding 914a is electrically coupled to a first load 918a. The second secondary winding 914b is electrically coupled to a second load 918b. The third secondary winding 914c is electrically coupled to a third load 918c. The loads 918a, 918b, 918c may be one or more downstream loads which draw power from the power control apparatus 950, for example, a three-phase electric power grid.

The power control apparatus 950 comprises a first voltage source converter 952 and a second voltage source converter 954 each arranged to function as both a converter and as an inverter. Each voltage source converter is a three-phase voltage source converter, and comprises a plurality of transistors and a plurality of capacitors. Each voltage source converter includes AC terminals and DC terminals. The DC terminals of the first and second voltage source converters 952, 954 are each electrically coupled to a means of storing energy 956. The AC terminals of the first voltage source converter 952 are electrically coupled to each of a tap 922a in the first primary winding 912a, a tap 922b in the second primary winding 912b, and a tap 922c in the third primary winding 912c. The AC terminals of the second voltage source converter 954 are electrically coupled to each of a tap 928a in the first secondary winding 914a, a tap 928b in the second secondary winding 914b, and a tap 928c in the third secondary winding 914c. Some or all of the voltage source converters may be connected to modulation windings on a limb instead of being electrically coupled to a tap in the primary winding or second winding.

When an electrical signal from one of the AC power supplies 916a, 916b, 916c is introduced to the primary winding of its respective limb, an electromagnetic field is induced in the magnetic core 901. The electromagnetic field in the magnetic core 901 induces an electrical signal into the secondary windings of the other two limbs.

The power control apparatus 950 comprises a controller (not illustrated) which may be communicatively coupled to each of the first and second voltage source converters 952, 954. The controller is configured to receive data associated with parameters of the input electrical signal in each of the primary windings 912a, 912b, 912c. For example, the parameters may include voltage, current, frequency, phase angle and/or power factor. The controller may receive the data from one or more voltage and/or current sensors.

The controller is configured to compare the parameters of the input signal to parameters of a reference signal for each of the secondary windings 914a, 914b, 914c. The reference signals each comprise an idealised waveform with desired parameters of the output signal in each of the secondary windings, for example, without noise or harmonics. The controller is configured to determine a set of harmonisation signals comprising a harmonisation signal for at least one of the primary windings 912a, 912b, 912c. When the set of harmonisation signals is applied to at least one primary winding, the output electrical signal in the secondary windings 914a, 914b, 914c approximate their respective reference signal, for example, by destructive interference. The controller is configured to cause application of the set of harmonisation signals to the primary windings 912a, 912b, 912c using the first voltage source converter 952. Accordingly, once the set of harmonisation signals is applied, the output electrical signals in the secondary windings 914a, 914b, 914c are substantially identical to their respective reference signals.

Figure 12:
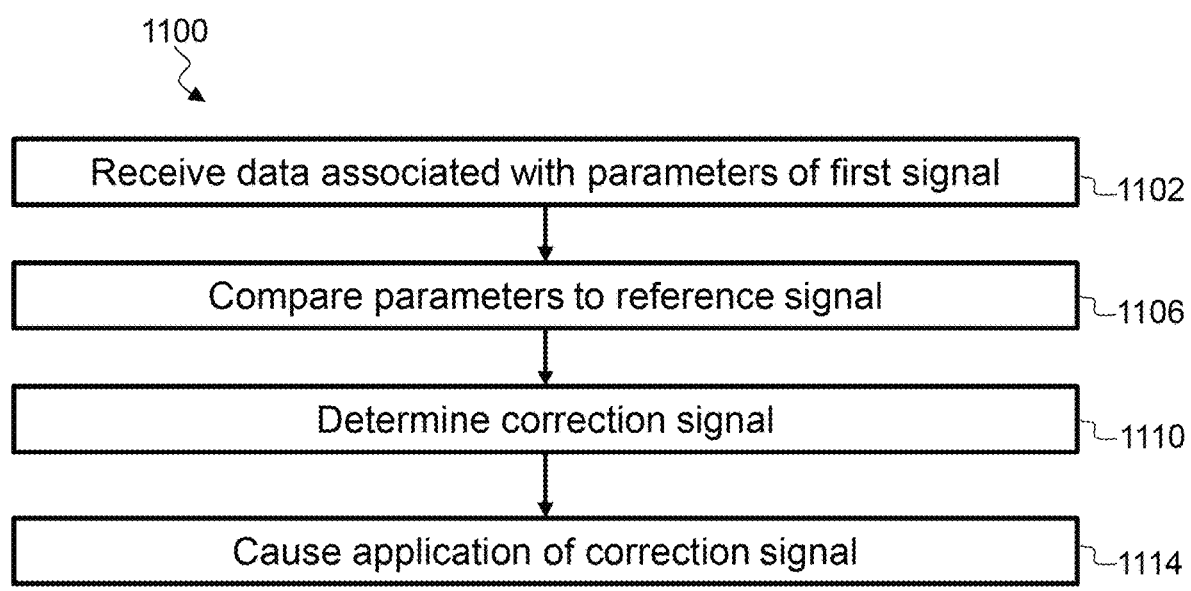
FIG. 12 is a flowchart of a method of modulating an electrical power signal.

With reference to FIG. 12 a method 1100 is described for modulating a second signal in a secondary winding of a power control apparatus, such as any of the power control apparatuses described above. The power control apparatus has a magnetic core comprising a first limb and a second limb, wherein a primary winding is arranged around the first limb, and the secondary winding is arranged around the second limb. The method 1100 is executed by a controller and includes, at step 1102, receiving data associated with parameters of a first signal in the primary winding. For example, the parameters may include voltage, current, frequency, phase angle and/or power factor. The controller may receive the data from one or more voltage and/or current sensors. The data associated with parameters may be received from one or more voltage and/or current sensors associated with the primary winding and/or the secondary winding.

At step 1106, the controller compares the parameters of the first signal to parameters of a reference signal for the secondary winding. The reference signals each comprise an idealised waveform with desired parameters of the output signal in each of the secondary windings, for example, without noise or harmonics.

At step 1110, the controller determines a harmonisation signal which, when applied to the first limb, causes the output electrical signal in the secondary winding to approximate the reference signal, for example, by destructive interference. At step 1114, the controller causes application of the harmonisation signal to the first limb using a voltage source converter. In power control apparatuses in which the primary winding comprises a tap, the voltage source converter is connected to the tap and the voltage source converter is configured to apply the harmonisation signal to the first limb using the tap. In power control apparatuses in which the first limb includes a modulation winding, the voltage source converter is connected to the modulation winding and the voltage source converter is configured to apply the harmonisation signal to the first limb using the modulation winding. Once the harmonisation signal is applied, the output electrical signal in the secondary winding is substantially identical to the reference signal.

In this disclosure, unless the context indicates otherwise, the term "signal" is used for ease of reference, and is to be construed broadly as referring to a form of electrical energy characterised by a voltage, current, and at least one fundamental frequency (which would be zero in the case of a DC voltage), and does not necessarily require that any form of information is represented by or conveyed by the signal.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term "comprising" or "including" does not exclude the presence of other elements.

Any of the controllers described above represent one or more general-purpose processors such as a microprocessor, central processing unit, or the like. More particularly, the controller may be a complex instruction set computing (CISC) microprocessor, reduced instruction set computing (RISC) microprocessor, very long instruction word (VLIW) microprocessor, processor implementing other instruction sets, or processors implementing a combination of instruction sets. The controller may also be one or more special-purpose processing devices such as an application specific integrated circuit (ASIC), a field programmable gate array (FPGA), a digital signal processor (DSP), network processor, or the like. The controller is configured to execute the processing logic for performing the operations and steps discussed herein.

The controller may be communicatively coupled to a data storage device. The data storage device may include one or more machine-readable storage media (or more specifically one or more non-transitory computer-readable storage media) on which is stored one or more sets of instructions embodying any one or more of the methodologies or functions described herein. The instructions may also reside, completely or at least partially, within the controller during execution thereof.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid state memory, magnetic tape, a removable computer diskette, a random access memory (RAM), a read-only memory (ROM), a rigid magnetic disc, and an optical disk.

The invention claimed is:

1. A power control apparatus comprising:
   a magnetic core comprising a first limb, a second limb, and a third limb, wherein the first limb, second limb and third limb are each arc-shaped limbs, wherein each limb is arranged around a central axis, and each limb has a first end and a second end, wherein the first ends of the limbs are mutually connected at a first position along the central axis, and the second end of the limbs are mutually connected at a second position along the central axis;
   a primary winding arranged around the first limb, wherein the primary winding is electrically coupled to a first AC power supply having a first phase, and wherein the first AC power supply induces a first signal in the primary winding;
   a second secondary winding arranged around the second limb, wherein the second secondary winding is electrically coupled to a second load;
   a third secondary winding arranged around the third limb, wherein the third secondary winding is electrically coupled to a third load;
   a first voltage source converter having an AC connection and a DC connection, wherein either the AC connection of the first voltage source converter is electrically coupled to the primary winding, or the power control apparatus comprises a modulation winding arranged around the first limb and the AC connection of the first voltage source converter is electrically coupled to the modulation winding arranged around the first limb;
   a second voltage source converter having an AC connection and a DC connection, wherein either the AC connection of the second voltage source converter is electrically coupled to each of the second secondary winding and the third secondary winding, or the power control apparatus comprises a respective modulation winding arranged around each of the second and third limbs and the AC connection of the second voltage source converter is electrically coupled to each of the modulation windings arranged around each of the second and third limbs; and
   a controller communicatively coupled to each of the first voltage source converter and the second voltage source converter, the controller configured to:
   receive data associated with parameters of the first signal in the primary winding;
   compare the parameters of the first signal to parameters of a respective reference signal for each of the second secondary winding and the third secondary winding;
   determine a harmonisation signal which, when applied to the first limb, causes a respective second signal in each of the second secondary winding and the third secondary winding to approximate the respective reference signal; and
   cause application of the harmonisation signal to the first limb using the first voltage source converter.

2. The power control apparatus of claim 1, wherein the AC connection of the first voltage source converter is electrically coupled to the primary winding, and the controller is configured to cause application of the harmonisation signal to the first limb using the first voltage source converter by causing application of the harmonisation signal to the primary winding using the first voltage source converter.

3. The power control apparatus of claim 2, wherein the AC connection of the voltage source converter is electrically coupled to a tap along the primary winding.

4. The power control apparatus of claim 2, wherein the AC connection of the voltage source converter is electrically coupled to the modulation winding, and wherein the controller is configured to cause application of the harmonisation signal to the first limb using the first voltage source converter by causing application of the harmonisation signal to the modulation winding using the first voltage source converter.

5. The power control apparatus of claim 4, wherein the AC connection of the second voltage source converter is electrically coupled in parallel with a load on the second secondary winding.

6. The power control apparatus of claim 5, wherein the primary winding is a first primary winding, and the power control apparatus comprises a second primary winding arranged around the second limb, and a third primary winding arranged around the third limb, wherein each of the first primary winding, the second primary winding and the third primary winding is arranged to carry a different phase of a three-phase AC signal.

7. The power control apparatus of claim 6, wherein the AC connection of the voltage source converter is electrically coupled to a tap along the primary winding.

8. The power control apparatus of claim 7, wherein the magnetic core has a toroidal shape.

9. The power control apparatus of claim 1, wherein the AC connection of the voltage source converter is electrically coupled to the modulation winding, and wherein the controller is configured to cause application of the harmonisation signal to the first limb using the first voltage source converter by causing application of the harmonisation signal to the modulation winding using the first voltage source converter.

10. The power control apparatus of claim 1, wherein the AC connection of the second voltage source converter is electrically coupled to a tap along the second secondary winding.

11. The power control apparatus of claim 1, wherein the AC connection of the second voltage source converter is electrically coupled in parallel with a load on the second secondary winding.

12. The power control apparatus of claim 1 comprising means for storing energy, wherein the means for storing energy is coupled to the DC connection of the first voltage source converter, and the means for storing energy comprises one or more of: a capacitor, a battery, a flywheel, a thermal energy store, an electrolyser, a heat pump, and an air compressor.

13. The power control apparatus of claim 1, wherein the magnetic core has a toroidal shape.

14. The power control apparatus of claim 1, wherein the primary winding is a first primary winding, and the power control apparatus comprises a second primary winding arranged around the second limb, and a third primary winding arranged around the third limb, wherein each of the first primary winding, the second primary winding and the third primary winding is arranged to carry a different phase of a three-phase AC signal.

15. The power control apparatus of claim 1, wherein the harmonisation signal causes the respective second signal in each of the second secondary winding and the third secondary winding to approximate the respective reference signal by compensating for harmonics in the first signal so that the harmonics are removed or reduced in the respective second signal.

16. A method of modulating a respective second signal in each of a second secondary winding and a third secondary winding of a power control apparatus having a magnetic core comprising a first limb, a second limb, and a third limb, wherein the first limb, the second limb and the third limb are each arc-shaped limbs, wherein each limb is arranged around a central axis, and each limb has a first end and a second end, wherein the first ends of the limbs are mutually connected at a first position along the central axis, and the second end of the limbs are mutually connected at a second position along the central axis, wherein a primary winding is arranged around the first limb, the primary winding is electrically coupled to a first AC power supply having a first phase and the first AC power supply induces a first signal in the primary winding, the second secondary winding is arranged around the second limb, and the third secondary winding is arranged around the third limb, the second secondary winding is electrically coupled to a second load, the third secondary winding is electrically coupled to a third load, the power control apparatus further having a first voltage source converter having an AC connection and a DC connection, and a second voltage source converter having an AC connection and a DC connection, wherein either the AC connection of the first voltage source converter is electrically coupled to the primary winding, or the power control apparatus comprises a modulation winding arranged around the first limb and the AC connection of the first voltage source converter is electrically coupled to the modulation winding arranged around the first limb, and wherein either the AC connection of the second voltage source converter is electrically coupled to each of the second secondary winding and the third secondary winding, or the power control apparatus comprises a respective modulation winding arranged around each of the second and third limb and the AC connection of the second voltage source converter is electrically coupled to each of the modulation windings arranged around each of the second and third limbs, the method comprising:
receiving data associated with parameters of a first signal in the primary winding;
comparing the parameters of the first signal to parameters of a respective reference signal for each of the second secondary winding and the third secondary winding;
determining a harmonisation signal which, when applied to the first limb, causes the respective second signal in each of the second secondary winding and the third secondary winding to approximate the respective reference signal; and
causing application of the harmonisation signal to the first limb using the first voltage source converter.

17. The method of claim 16, wherein causing application of the harmonisation signal to the first limb using the first voltage source converter comprises causing application of the harmonisation signal to the primary winding using the first voltage source converter.

18. The method of claim 17, wherein causing application of the harmonisation signal to the primary winding using the first voltage source comprises causing application of the harmonisation signal to a tap in the primary winding using the first voltage source converter.

19. The method of claim 16, wherein causing application of the harmonisation signal to the first limb using the first voltage source converter comprises causing application of the harmonisation signal to the modulation winding arranged around the first limb using the first voltage source converter.

20. The method of claim 16, wherein the harmonisation signal causes the respective second signal in each of the second secondary winding and the third secondary winding to approximate the respective reference signal by compensating for harmonics in the first signal so that the harmonics are removed or reduced in the respective second signal.

* * * * *